United States Patent [19]
Ototani et al.

[11] Patent Number: 4,698,095
[45] Date of Patent: * Oct. 6, 1987

[54] COMPOSITE CALCIUM CLADS FOR TREATING MOLTEN IRON

[75] Inventors: Tohei Ototani, No. 10-505, Daiichi-Chiku, Kawauchi, Sendai; Yasuji Kataura, both of Sendai City, Japan

[73] Assignee: Tohei Ototani, Japan

[*] Notice: The portion of the term of this patent subsequent to Jul. 19, 1994 has been disclaimed.

[21] Appl. No.: 868,387

[22] Filed: May 29, 1986

Related U.S. Application Data

[63] Continuation of Ser. No. 802,955, Nov. 27, 1985, which is a continuation of Ser. No. 746,465, Jun. 20, 1985, abandoned, which is a continuation of Ser. No. 658,073, Oct. 5, 1984, abandoned, which is a continuation of Ser. No. 233,254, Feb. 10, 1981, abandoned, which is a continuation of Ser. No. 929,050, Jul. 28, 1978, abandoned, which is a continuation of Ser. No. 285,703, Apr. 7, 1977, abandoned, which is a continuation of Ser. No. 598,477, Jul. 23, 1975, Pat. No. 4,035,892, which is a continuation-in-part of Ser. No. 374,431, Jun. 28, 1973, abandoned.

[30] Foreign Application Priority Data

Jun. 30, 1972 [JP] Japan .................................. 47-65757
Dec. 27, 1972 [JP] Japan .................................. 48-1615

[51] Int. Cl.$^4$ .............................................. C21C 7/02
[52] U.S. Cl. .......................................... 75/58; 75/53
[58] Field of Search ...................................... 75/53, 58

[56] References Cited

U.S. PATENT DOCUMENTS

| | | | |
|---|---|---|---|
| 4,035,892 | 7/1977 | Ototani | 75/58 |
| 4,094,666 | 6/1978 | Ototani | 75/58 |
| 4,134,196 | 1/1979 | Yamaji | 75/58 |
| 4,143,211 | 3/1979 | Obinata | 75/58 |
| 4,205,981 | 6/1980 | Watmough | 75/58 |

Primary Examiner—Peter D. Rosenberg
Attorney, Agent, or Firm—Sughrue, Mion, Zinn, Macpeak, and Seas

[57] ABSTRACT

Composite calcium materials to be used for welding or refining steel, nickel, nickel alloy or iron alloy, which are produced by cladding a sheath of aluminum, iron or alloys thereof and a core consisting of (1) a mixture or an alloy of calcium or an alloy thereof with at least one element of aluminum and rare earth metals, (2) a mixture of calcium or an alloy thereof with a flux of silicates, oxides or halides of alkaline earth metals, or (3) a mixture consisting of the above described mixture or alloy (1) with the flux as described in the above item (2).

2 Claims, 3 Drawing Figures

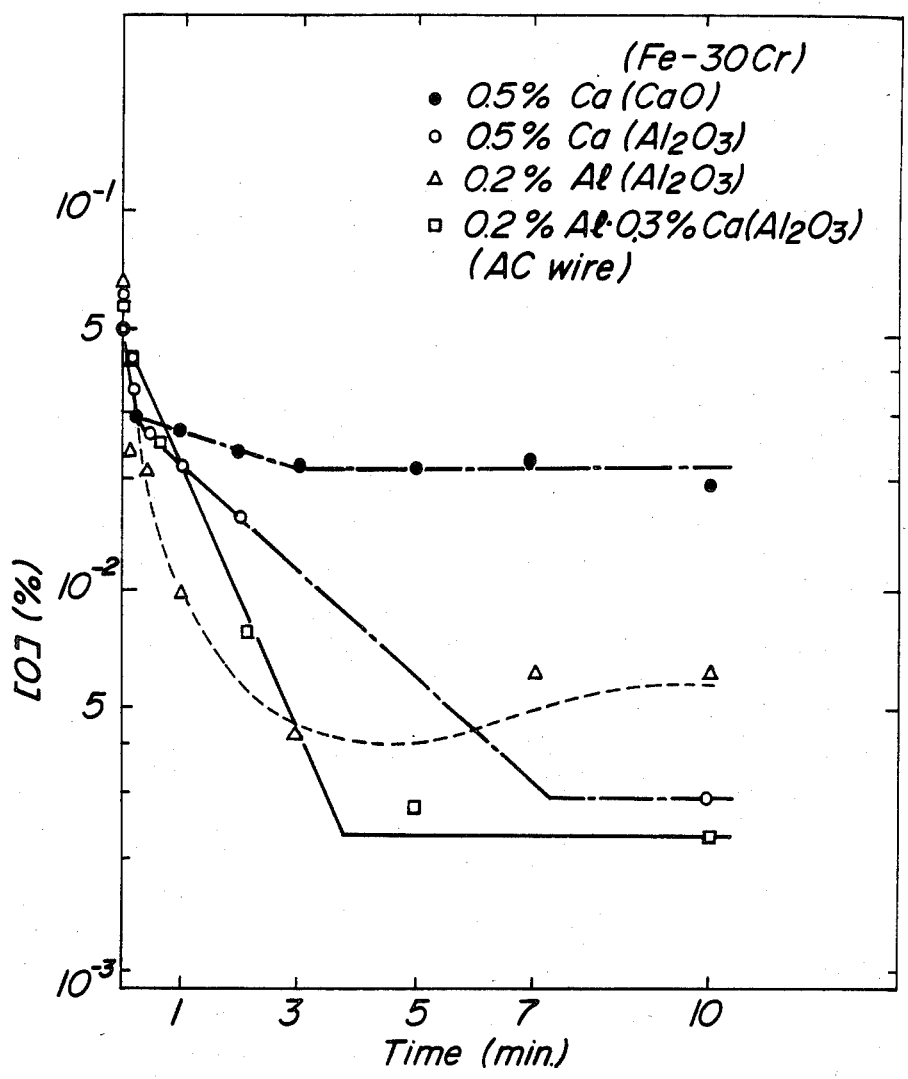
FIG_1

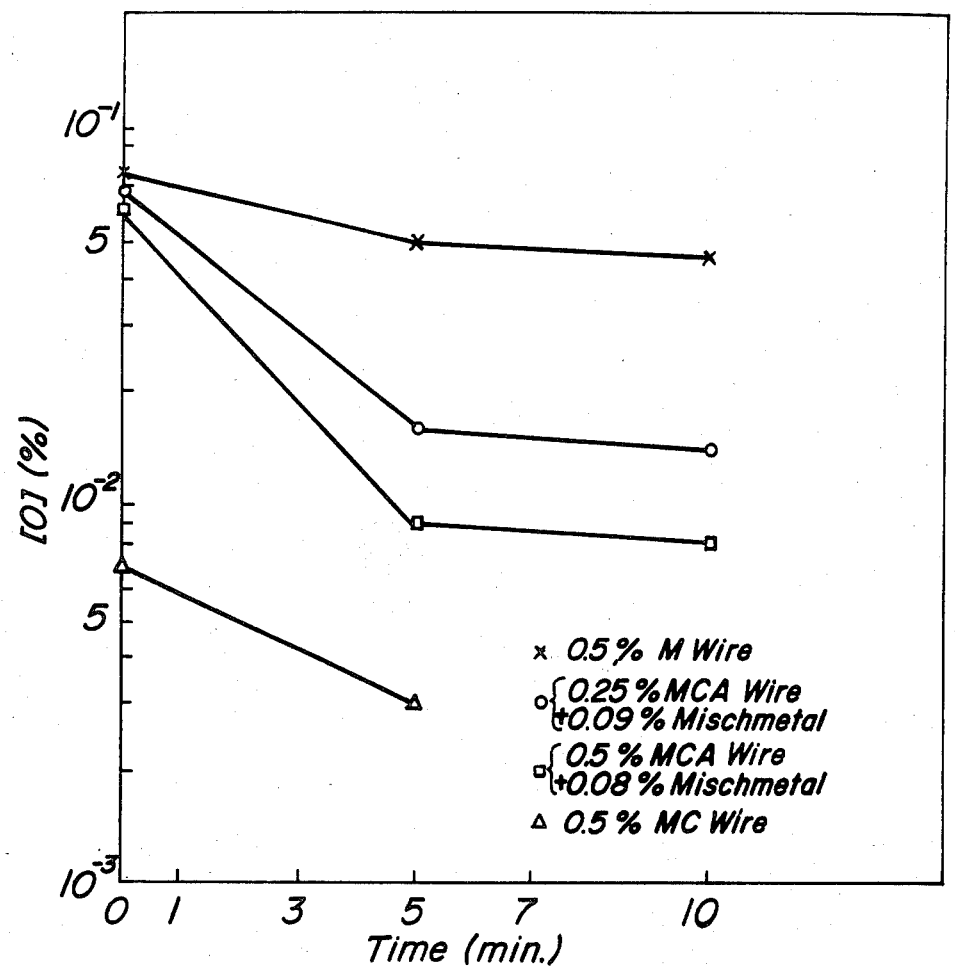
FIG_2
Deoxidation of 30Cr2Mo Molten Steel Depending Upon Various Iron Glad Wires

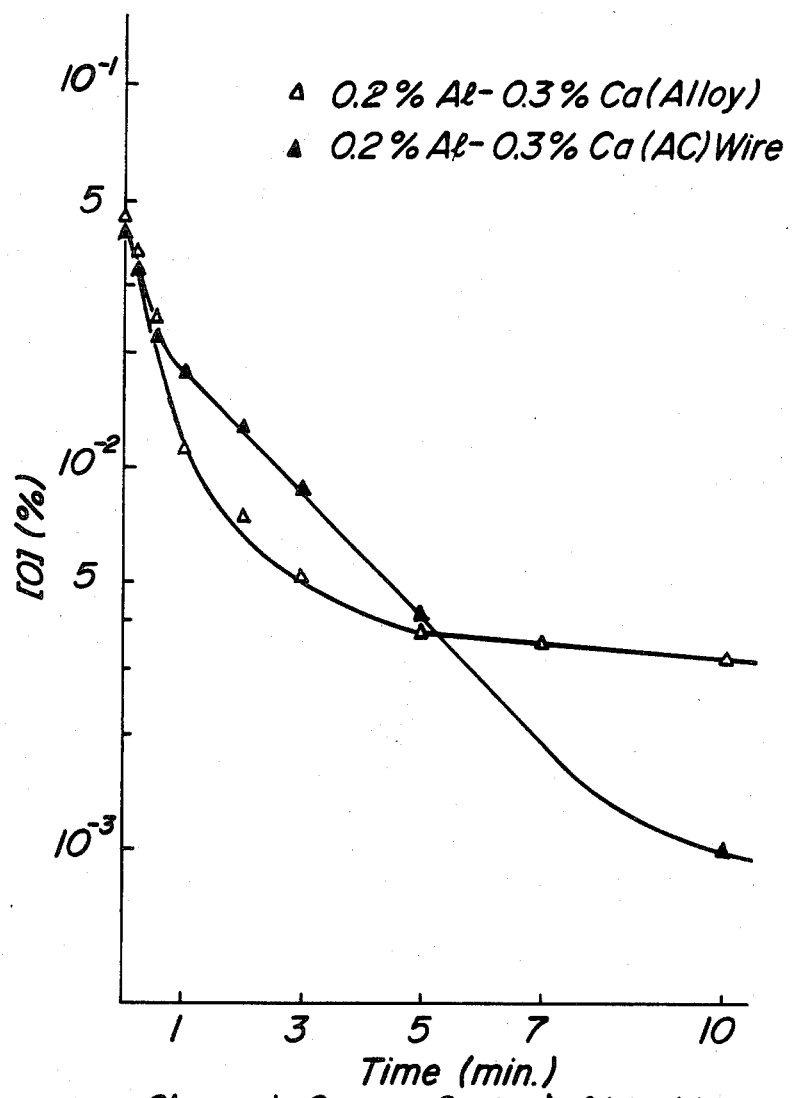
FIG_3
Change in Oxygen Content of Liquid Iron After Adding Ca Al Alloy or AC Wire

COMPOSITE CALCIUM CLADS FOR TREATING MOLTEN IRON

This application is a continuation application of Ser. No. 802,955 filed Nov. 27, 1985, in turn a continuation application of Ser. No. 746,465 filed June 20, 1985, now abandoned, in turn a continuation application of Ser. No. 658,073 filed Oct. 5, 1984, now abandoned, in turn a continuation application of Ser. No. 233,254 filed Feb. 10, 1981, now abandoned, in turn a continuation application of Ser. No. 929,050 filed July 28, 1978, now abandoned, in turn a continuation application of Ser. No. 785,703 filed Apr. 7, 1977, now abandoned, in turn a continuation application of Ser. No. 598,477 filed July 23, 1975, now U.S. Pat. No. 4,035,892, in turn a continuation-in-part application of Ser. No. 374,431 filed June 28, 1973, now abandoned.

The present invention relates to composite calcium clad wires to be used for welding and refining of iron, steels and other metals and method for treating said metals.

It has been previously known that calcium added to various molten metals and alloys is effective for deoxidation and desulfurization of these molten metals.

However, since the boiling point of calcium at 1 atm. is 1,482° C., if calcium per se is added to the molten metals, the yield of calcium is poor and only several %.

The inventors have proposed in U.S. Pat. No. 2,950,187 production of an alloy containing calcium and iron in order to improve the above described drawbacks, in which silicon or aluminum having a chemical affinity to both calcium and iron is added as a third element.

U.S. Pat. No. 2,085,802 discloses that molten metals can be purified by introducing a calcium core inserted in a sheath of a heavy iron or steel rod.

U.S. Pat. No. 2,705,196 discloses a process for deoxidizing a molten metal by adding aluminum, calcium, titanium, magnesium, cerium, other earth alkali metals or alkali metals.

Furthermore, U.S. Pat. No. 2,819,956 discloses an addition agent for the treatment of steel, in which a core of a mixture of calcium and aluminum is capsuled by iron.

However, the refining activity of these prior arts is inferior to that of the composite calcium clad wires of the present invention as proved by the Examples 8-10 as described hereinafter.

Furthermore, as a welding rod for iron and steel, a clad material composed of a mild steel as a sheath and a flux as a core has been heretofore used. For example, in a nongas arc process using a flux-containing wire, use is made of a composite clad in which a flux is used as a core and a mild steel is used as a sheath.

The inventors have found that a composite calcium clad wire obtained by cladding a sheath of aluminum or iron or an alloy thereof and a core of an alloy or a mixture of calcium or an alloy thereof with at least one element selected from the group consisting of aluminum and rare earth metals shows a remarkably high activity for deoxidation and desulfurization of molten iron, steel or nickel or nickel alloys and that the yield of the added calcium is considerably improved.

Moreover, the inventors have found that a composite calcium clad wire obtained by cladding a sheath of aluminum or iron or an alloy thereof and a core having the hereinafter mentioned composition is not only preferred for a welding rod of iron or steel but also is effective for deoxidation and desulfurization of the molten metals as mentioned above.

Namely, the core consists of a flux consisting of, at least one of silicates, oxides and halides of alkaline earth metals and calcium or powdery alloy thereof, or a mixture of calcium or a powdery alloy thereof with at least one element of aluminum and rare earth metals.

Accordingly, the second composite material according to the present invention contains the following composition other than the flux as the core material and is characterized in this point.

That is, as the first group, calcium or an alloy thereof is contained and as the second group, at least one of aluminum and rare earth metals is contained other than the first group.

Consequently, when using as a welding rod, the deoxidation and desulfurization reactions due to calcium or the alloy thereof of the first group are promoted by the second group and the refining is accomplished and further the drawbacks in the weld zone, for example, formations of pits and blow holes are substantially obviated. The progress of desulfurization improves the mechanical strength of the weld zone and particularly serves to prevent the intergranular fracture.

Furthermore, when using as an additive for molten steel, the deoxidation and desulfurization of the molten steel are improved as mentioned above and the second group serves as a promoter of these reactions and further the recovery of the second group and the first group is considerably improved.

The composite calcium clad wire according to the present invention is a clad of the sheath material and the core material. By using this clad, the welded metals having a sound mechanical properties can be obtained and by introducing the composite material of the pesent invention into a molten iron or steel or a molten nickel or alloy thereof, the effect of deoxidation and desulfurization of calcium is broadly improved.

The cladding may be carried out as follows. That is, the core component cast in a steel tube is compressed or deformed by cold rolling, hot rolling, drawing, forging or swaging or the core component is inserted into a steel tube having a conventional shape and size and then the combined material is subjected to a cold rollng, a hot rolling, drawing, forging or swaging.

When the core component is to be cladded in an aluminum tube, the core component is inserted into the aluminum tube and then a cladding is conducted.

The calcium alloys to be used in the core include calcium.aluminum alloy, calcium.magnesium.silicon alloy, calcium.silicon alloy and calcium.manganese.silicon alloy.

An amount of the core is 10–90% by weight based on the clad. When the core is less than 10% by weight, the amount of calcium added is too small and the effectiveness of addition of calcium cannot be expected, while when the core is more than 90% by weight, the thickness of the sheath is too thin and the effectiveness of the clad cannot be fully attained and the yield of calcium cannot be improved and therefore such an amount is not economic.

The amount of the flux in the second composite calcium clad wire according to the present invention is not more than 90% by weight based on the total amount of the core material, because when the flux of more than 90% by weight is covered with aluminum, iron or an alloy thereof, the amount of calcium is too small and the function of deoxidation and desulfurization cannot be fulfilled.

The weight ratio of at least one element of aluminum and rare earth metals to calcium or the alloy thereof is preferred to be less than 1:1. Because the second group of aluminum and rare earth metals is added in order to lower the melting point of calcium oxide which is a product of deoxidation, the addition of these elements of more than 1:1 has no effect for such a purpose.

These calcium clad wires become more dense and compact by forging, swaging or rolling than the prior art of capsule process as disclosed in U.S. Pat. No. 2,819,956. The cladded core is perfectly solid and protected by iron or aluminum sheath. By mechanically feeding these wires into molten steel, the inventors confirmed nearly 100% yield of calcium without forming fume and flame of added calcium, because the fed core materials of wire can reach to the bottom of molten metals in ladle.

BRIEF DESCRIPTION OF THE DRAWING

FIGS. 1, 2 and 3 of the drawing illustrate the data obtained in Examples 8, 9 and 10 respectively of the following Examples.

The following examples are given for the purpose of illusration of this invention and are not intended as limitations thereof.

EXAMPLE 1

In a crucible having a magnesia lining was melted 2 Kg of a hyper eutectoid steel composed of 1.3% of C, 1.0% of Si, 0,6% of Mn, 0.005% of oxygen, 0.01% of sulfur and the remainder of Fe under a CaO shielding by means of a high frequency furnace, and then 1% by weight of a clad wire composed of a sheath of a steel tube having an outer diameter of 10 mm and an inner diameter of 8.6 mm and a core having an outer diameter of 8.6 mm and composed of 24% by weight based on the total amount of the clad, of Ca and 16% by weight based on the total amount of the clad, of Al (the amount of the core was 40% by weight based on the clad), which had been prepared by cold rolling was added to the molten steel at 1,520° C. As the result of this treatment, 1 minute after the addition of the clad, the oxygen content and the sulfur content were decreased to 0.003% and 0.004%, respectively.

Accordingly, the addition of the clad wire of the present invention is remarkably effective to the deoxidation and desulfurization of hyper eutectoid steel. Moreover, when the clad wire is added to the hyper eutectoid steel, the residual amount of calcium is 0.015-0.02%, which is about 2-3 times of the residual amount of 0.008% in the case when 0.5% of metallic calcium is added. Said residual amount in the addition of the clad wire of the present invention is much higher than the residual amount in the case when Ca alloy is used. Therefore, the clad wire of the present invention is very useful commercially.

EXAMPLE 2

By using a machine for producing an Arcos type welding rod, was produced a calcium clad wire covered with steel having a diameter of 3.1 mm from a sheath of a mild steel hoop having a thickness of 0.25 mm and a width of 35 mm and a core composed of, 15% by weight based on the total amount of the clad, of powdery metallic calcium of less than 8 meshes and 5% by weight based on the total amount of the clad, of powdery lime having less than 32 meshes. The obtained calcium clad wire was used as a welding rod of an arc welding for a thick steel plate having the following chemical composition.

Chemical composition of the base metal (Wt.%)
C 0.15, Si 0.21, Mn 0.42, P 0.01, S 0.023, O 0.007.
The composition of the deposited metal is as follows.
C 0.12, Si 0.15, Mn 0.31, P 0.01, S 0.007, O 0.005.

As seen from the above data, the deposited metal is lower than the base metal in both the amounts of sulfur and oxygen and in the weld zone any blow holes and pit were not found and the very good weld zone was obtained.

EXAMPLE 3

The same calcium clad wire covered with steel having a diameter of 3.1 mm as used in Example 2 was used for an arc welding of a high tension steel plate of HT 50 grade. Since the core contained a strong degassing agent, the molten metal was refined through the deoxidation reaction and a slag was formed to protect and cover the molten pool at the weld zone and the impurities of oxides, sulfur and phosphorous in the welded metal were reduced to improve the purity. More particularly, the intergranular fracture at the weld zone due to sulfur was prevented. The following Tables 1 and 2 show the chemical components and the mechanical properties in the base metal to be welded and the deposited metal.

TABLE 1

| Sample | Chemical component (%) | | | | |
|---|---|---|---|---|---|
| | C | Si | Mn | P | S |
| Base metal | 0.09 | 0.46 | 0.75 | 0.015 | 0.012 |
| Deposited metal | 0.10 | 0.26 | 0.68 | 0.011 | 0.008 |

TABLE 2

| | Mechanical properties of the deposited metal | | | | | | |
|---|---|---|---|---|---|---|---|
| | Yield point ($Kg/mm^2$) | Tensile strength ($Kg/mm^2$) | Elongation (%) | Reduction of area (%) | Impact value (V notch $Kg \cdot m/cm^2$) Test temperature | | |
| | | | | | −40° C. | −20° C. | 0° C. |
| Welding as such | 48.7 | 57.5 | 28.6 | 67.4 | 4.8 | 8.2 | 13.3 |

EXAMPLE 4

A 2.5 mm of composite calcium clad wire covered with aluminum was produced from a sheath of aluminum hoop having a thickness of 0.25 mm and a width of 35 mm and a core consisting of 25% by weight based on the total amount of the clad, of powdery clacium of 9 meshes, 5% by weight based on the total amount of the clad, of powdery magnesium of less than 15 meshes and 5% by weight based on the total amount of the clad, of a mixture of powdery lime and powdery fluorite by means of a machine for producing an Arcos type welding rod.

The resulting composite calcium clad wire was used under the following conditions in the production of Ni—Cr low alloy steel by means of a Concast type continuous casting machine.

| Feed rate: | 20'/min. |
|---|---|
| Casting rate: | 590 lb/min./mold. |
| Total cast amount: | 40,000 lb/mold. |
| Total amount of wire used: | 1,360 ft. namely 10.8 lb/melt/strand. |

In the produced ingot, no surface defect owing to alumina cluster usually observed was found and a surface of the thin rolled plate was very smooth and favorable. In this Example, powdery aluminum or rare earth metals was used instead of the above described powdery magnesium as the second group element respectively to produce the composite calcium clad wires and the same tests as described above were made by means of these calcium clad wires and substantially the same results were obtained.

EXAMPLE 5

20 Kg of 30% Cr and 2% of Mo of ferrite type stainless steel formed from low carbon 60% Fe—Cr and low carbon magnetic steel plate was melted by means of an induction vacuum melting furnace and then 1% by weight of the same calcium clad wire covered with the mild steel hoop and having a diameter of 3.1 mm as described in Example 2 was added thereto.

The components after the addition were as follows: C 0.005, Si 0.28, Mn 0.15, P 0.015, S 0.007, O 0.003, N 0.01.

The above amounts of sulfur and oxygen owing to the addition of calcium were considerably lower than those in the conventional vacuum melting and it was confirmed that the calcium clad covered with the mild steel hoop was effective for the deoxidation and desulfurization.

EXAMPLE 6

After 14% Ni-15% Cr-2% W steel was melted in 5 ton Héroult furnace, 0.2% by weight of 2.5 mm of the same composite calcium clad wire as in Example 4 was added to the molten steel.

The chemical components after the addition were as follows. C 0.38, Si 2.31, Mn 0.43, P 0.019, S 0.003, Ni 13.78, Cr 14.96, W 2.47, O 0.0023.

The amounts of sulfur and oxygen after the addition were reduced to about half value as compared with the amounts prior to the addition.

EXAMPLE 7

A mixture of metallic calcium granules having a grain size of less than 3 mm and powdery lime, said mixture ratio of calcium to lime being 7:3, was inserted into a sheath of steel tube having an outer diameter of 27.2 mm (thickness of 2.3 mm) and then the resulting combined material was subjected to a cold forging and a swaging to form a composite calcium clad wire covered with steel having an outer diameter of 9 mm. The amount of the core was 15% by weight based on the clad.

3 Kg of 25% Cr-20% Ni stainless steel was melted by a basic high frequency furnace and the above described composite calcium clad wire was added thereto twice at 1,580° C. under a flux of unslaked lime, the addition amount of the composite calcium clad wire in each time being 2% by weight. The change of the amount of oxygen, sulfur, phosphorous and calcium prior to the addition and after the addition was as follows.

| | Chemical Components | | | |
|---|---|---|---|---|
| | O | S | P | Ca |
| Prior to addition | 0.028 | 0.018 | 0.015 | — |
| After addition | 0.008 | 0.007 | 0.010 | 0.005 |

From the above data it can be seen that the addition of the composite calcium clad wire was remarkably effective for the deoxidation and desulfurization of the higher alloy steel bath and further the residual amount of calcium was high and therefore the composite calcium clad wire was effective for the improvement of the quality.

The following Examples 8 and 9 show that Ca clad (sheath: iron, core: Ca, that is, iron clad calcium, in U.S. Pat. No. 2,085,802) and Al (disclosed in U.S. Pat. No. 2,705,196) are inferior in the deoxidizing ability in the molten steel to the clads according to the present invention.

EXAMPLE 8

Comparison of aluminum or iron clad 20% calcium with iron clad 8% aluminum-12% calcium.

The deoxidizing ability of these additives was determined with respect to 30% Cr molten steel. Using a vacuum induction furnace each 500 g of electrolytic iron and 60% chromium iron was melted under the argon atmosphere in the crucibles as described hereinafter.

The iron clad calcium wire (0.5% by weight based on the molten steel of Ca) was added into the above described molten steel at 1,600° C. by using an alumina or lime crucible.

0.2% by weight of aluminum was added into the above described molten steel at 1,600° C. by using an alumina crucible.

The iron clad aluminum-calcium wire (0.5% by weight based on the molten steel of the mixed amount of Al and Ca, 0.2% Al, 0.3% Ca) was added into the above described molten steel at 1,600° C.

After the addition of the above mentioned deoxidants, variation of the oxygen contents was determined at various lapse of times as shown in the following FIG. 1 and the obtained results are shown in FIG. 1.

Samples were sucked up in 6 mm dia. non-transparent quartz tubes at different times and analysed for oxygen.

(1) Iron clad calcium addition (0.5% Ca) with lime crucible: The result is shown by Curve Ca(CaO). Deoxidation limit is found in the highest level and deoxidation is incomplete.

(2) Iron clad calcium addition (0.5% Ca) with alumina crucible: This result is shown by Curve Ca(Al$_2$O$_3$). By the reducing reaction of the following equation, besides deoxidation of calcium, the resulting aluminum contributes to deoxidizing reaction.

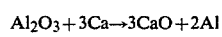

$$Al_2O_3 + 3Ca \rightarrow 3CaO + 2Al$$

(3) 0.2% of aluminum addition with alumina crucible: This result is shown by Curve Al(Al$_2$O$_3$). Deoxidizing rate is the highest among the other deoxidants, but the deoxidation process is unstable due to occurring the reoxidation.

(4) 0.5% of iron clad aluminum-calcium addition (0.2% Al, 0.3% Ca) with alumina crucible: This result is shown by Curve AC(Al$_2$O$_3$). Deoxidizing rate is relatively higher than others and the oxygen content reached the lowest to 23 ppm.

From the result of FIG. 1, the following facts can be seen.

(1) Comparison of the Curve AC(Al$_2$O$_3$) with the Curves Al(Al$_2$O$_3$) and Ca(Al$_2$O$_3$). (The crucibles in each test are the same, Al$_2$O$_3$).

The deoxidizing ability of the iron clad aluminum-calcium is higher than those of Al(Al$_2$O$_3$) and Ca(Al$_2$O$_3$).

Particularly, the calcium amount of the iron clad calcium is 0.5%, while the calcium amount in the iron clad calcium-aluminum is only 0.3%. Even though the calcium amount of the former clad is larger than that in the latter clad, the former clad is inferior in the deoxidizing ability to the latter clad.

(2) Comparison of the Curve Ca(CaO) with the Curve Ca(Al$_2$O$_3$). (The crucible is different).

From this comparison, it can be seen that the result of the iron clad calcium using alumina crucible is superior to that of the same iron clad calcium using lime crucible. This is because when alumina crucible is used, alumina in the material of the crucible reacts with calcium to form aluminum as shown in the above formula and the formed alumimum serves to act the deoxidant, but lime does not have such a function. This shows that the mixture of calcium and aluminum has higher activity than calcium only as the deoxidant.

From this experimental result, it is ascertained that the deoxidation of the iron clad aluminum-calcium wire is more effective than that of the iron clad calcium to the 30Cr molten steel.

EXAMPLE 9

This experiment shows that the iron clads wherein the cores consist of a mixture of calcium and rare earth metal or a mixture of calcium, aluminum and rare earth metal, have higher deoxidizing ability than the iron clad mischmetal.

The effect of the deoxidizing power on the 30CrMo molten steel was compared with the addition of various iron clad wires. Using a vacuum induction furnace electrolytic iron, electrolytic chromium and metallix molybdenum were charged in the above described alloy ratio and 30 Kg of the alloy steel was melted in vacuum condition of $4\times10^{-4}$ torr. In the argon atmosphere after melt down, 0.5% M, 0.5% MC, 0.25% MCA and 0.5% MCA wires were added at 1,600° C. into the molten steel with magnesia crucible. After the addition of the different deoxidants, variations of oxygen contents with time in the molten steel are shown in FIG. 2. Samples were sucked up into 6 mm dia non-transparent quartz tubes at different times and analysed for oxygen.

(1) M wire: Addition of 0.5% iron clad mischmetal containing 20% of mischmetal (0.1% addition as mischmetal).

Deoxidation limit is found in the highest level and deoxidation is incomplete.

(2) MC wire: Addition of 0.5% iron clad calcium-mischmetal containing 20% of Ca and 10% of mischmetal (0.1% Ca+0.05% mischmetal).

The oxygen decreased from 0.007% before the addition to 0.003%.

(3) MCA wire: Addition of 0.25% iron clad calcium-aluminum mischmetal containing 9.6% of Ca, 6.04% of Al and 4% of mischmetal (0.024% Ca+0.016% Al+0.01% mischmetal)

With the exception of the wire addition 0.09% of mischmetal was added. During 10 minutes after the addition the oxygen decreased from 0.067% to 0.014%.

(4) MCA wire: Addition of 0.5% iron clad calcium-aluminum-mischmetal containing 9.6% of Ca, 6.04% of Al and 4% mischmetal (0.048% Ca+0.032% Al+0.02% mischmetal).

With the exception of the wire addition 0.08% of mischmetal was added. During 10 minutes after the addition the oxygen decreased markedly from 0.06% to 0.008%.

The following Example 10 shows that the calcium-aluminum addition agent in the form of capsule in U.S. Pat. No. 2,819,956 is inferior in the deoxidizing ability in the molten steel to the clad wire according to the invention.

EXAMPLE 10

Comparison of Aluminum-Calcium Alloy with Iron Clad 8% Aluminum-12% Calcium

The deoxidizing ability of these additives was determined with respect to electrolytic iron melt. Using a vacuum induction furnace each 500 g of electrolytic iron was melted under the argon atomsphere in the crucibles as described hereafter.

0.5% Ca—Al alloy (0.2% Al, 0.3% Ca by weight based on the molten iron) enveloped with thin iron capsule (0.2 mm thickness, a diameter: about 12 mm) was added into the above described molten iron at 1,600° C. by using a lime crucible. The iron clad calcium-aluminum wire (0.2% Al, 0.3% Ca by weight based on the molten iron, prepared by Arcos process, diameter of the wire: 3.2 mm) was added into the above described molten iron at 1,600° C. by using lime crucible. After the addition of the above mentioned deoxidants variation of the oxygen contents was determined at various lapse of times as shown in the following FIG. 3, and the obtained results are shown in FIG. 3. Samples were sucked up into 6 mm dia non-transparent quartz tubes at different times and analysed for oxygen.

(1) 0.5% Ca—Al alloy capsule (0.2% Al, 0.3% Ca) with lime crucible.

The results are shown by curve Al—Ca Alloy (CaO). Deoxidation limit is found in the higher level than the iron clad Al—Ca addition and deoxidation is incomplete.

(2) 0.5% iron clad aluminum-calcium addition wire (0.2% Al, 0.3% Ca) with lime crucible.

Deoxidation rate is relatively higher than the Al—Ca Alloy and the oxygen content reached the lowest to 10 ppm.

From FIG. 3 the following facts can be seen.

(1) Comparison of the curve of the iron clad Al—Ca addition wire (CaO) with the curve of Ca—Al alloy capsule (CaO).

The deoxidizing ability of the iron clad aluminum-calcium wire is higher than that of Ca—Al alloy capsule. Particularly, the calcium amount in the iron calcium aluminum wire is the same with Ca—Al alloy capsule.

From this expriemental result, it is ascertained that the deoxidation of the iron clad aluminum-calcium wire is more effective than that of the calcium-aluminum alloy capsule to the molten iron.

EXAMPLE 11

By using a machine for producing an Arcos type welding rod, was produced calcium alloy clad wire covered with steel having a diameter of 4.8 mm from a sheath of a mild steel hoop having a thickness of 0.25 mm and a width of 35 mm and a core composed of 15% by weight based on the total amount of the clad of powder calcium silicon alloy of less than 8 meshes and 5% of powdery aluminum having less than 10 meshes.

Table 3 shows the test results when three charges of about 2 ton Cr—Mo steel casting were added with 0.5% iron clad wires in the ladle. The above mentioned wire contains 4.5% Ca, 9% Si, 5% Al and rest Fe.

TABLE 3

| Chemical composition and the decrease of sulfur by A.C. wire addition | | | | | | | |
|---|---|---|---|---|---|---|---|
| Charge | Chemical composition | | | | | Before addition | After addition |
| No. | C | Si | Mn | P | Cr | Mo | S | S |
| 1 | 0.19 | 0.68 | 0.75 | 0.014 | 1.31 | 0.48 | 0.018 | 0.009 |
| 2 | 0.15 | 0.66 | 0.78 | 0.022 | 1.14 | 0.64 | 0.015 | 0.010 |
| 3 | 0.16 | 0.71 | 0.81 | 0.024 | 1.50 | 0.62 | 0.020 | 0.010 |

What is claimed is:

1. A compressed and deformed composite clad wire for effectively deoxidizing molten metal, said composite wire consisting essentially of
   (1) a solidified integral elongated metallic calcium-containing core, encased in
   (2) a sheath of iron or an alloy thereof, with said core being 10–90% by weight based on the composite wire, and
   with said core material and said sheath having been subjected together, after insertion of the core material into the sheath, to mechanical compression and deformation applied to a direction substantially perpendicular to the longitudinal axis of the sheath so as to reduce the cross-sectional area of said composite wire and substantially increase the resistance of said composite wire to failure under bending when fed into a molten metal in a ladle, and to thereby enhance the capability of said composite wire for being continuously and mechanically fed to the bottom region of a molten metal in a ladle so as to introduce into said molten metal an amount of said core material effective to deoxidize said molten metal.

2. A composition clad wire of claim 1 wherein said mechanical compression and deformation renders the clad more dense compared to the clad prior to said mechanical compression and deformation.

* * * * *